(No Model.)

S. M. SCHINDEL.
SHIELD FOR PNEUMATIC TIRES.

No. 521,006. Patented June 5, 1894.

Witnesses
J. G. Meyer Jr.
Robert Emmett

Inventor
S. Milford Schindel
By Chas. B. Tilden
Attorney

THE NATIONAL LITHOGRAPHING COMPANY,
WASHINGTON, D. C.

UNITED STATES PATENT OFFICE.

SAMUEL MILFORD SCHINDEL, OF HAGERSTOWN, MARYLAND.

SHIELD FOR PNEUMATIC TIRES.

SPECIFICATION forming part of Letters Patent No. 521,006, dated June 5, 1894.

Application filed November 4, 1893. Serial No. 490,000. (No model.)

*To all whom it may concern:*

Be it known that I, SAMUEL MILFORD SCHINDEL, a citizen of the United States, residing at Hagerstown, in the county of Washington and State of Maryland, have invented new and useful Improvements in Protective Shields or Cushions for Pneumatic Tires for Bicycles, of which the following is a specification.

My invention relates to the construction of pneumatic tires for bicycles, the purpose thereof being to provide the air-inflated tube with an efficient protection against puncture.

It is my purpose, also, to provide a protective shield, or cushion, which may be combined with the pneumatic tire in any preferred manner which shall possess great power of resistance to the penetration of sharp points, or edges, such as nails, pieces of glass, sharp stones, or other objects, which shall be flexible and pliable, and which may be manufactured at an extremely low cost, and combined with, or incorporated in the pneumatic tire without materially increasing the cost of producing the latter.

My invention consists, to these ends, in the novel parts and combinations of parts hereinafter fully described and then particularly pointed out and described in the claims following this specification.

To enable others skilled in the art to which my invention pertains to fully understand and to make, construct and use the same, I will now describe said invention in detail, reference being had to the accompanying drawings, in which—

Figure 2:
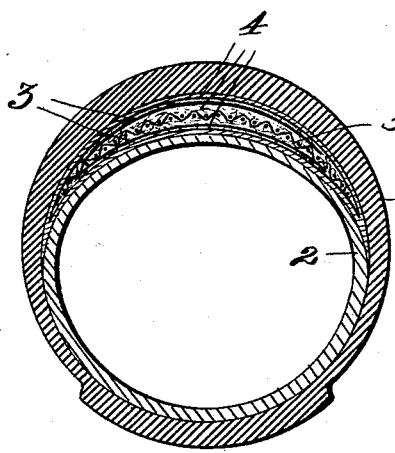
Figure 3:
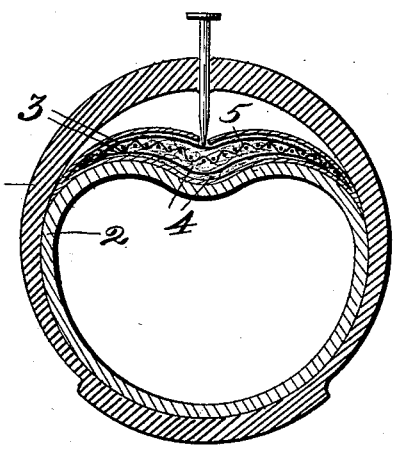
Figure 1:
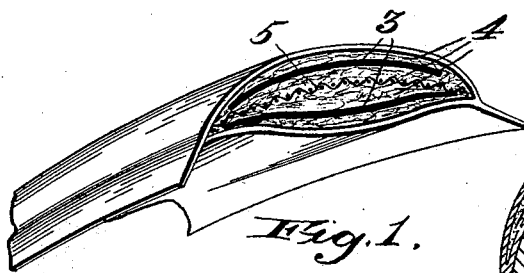
Figure 5:
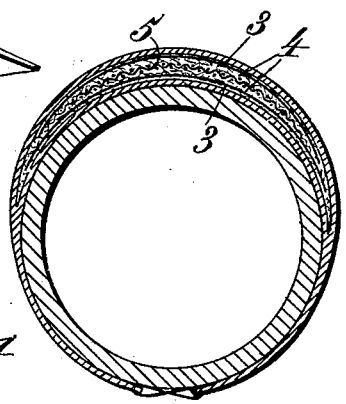
Figure 4:
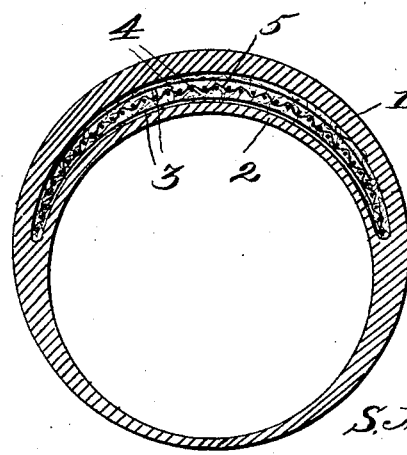

Figure 1, is a view in transverse section, partly in perspective, of a portion of the pocket, or casing, containing the puncture-proof cushion, or shield, the parts composing the same being shown as they appear prior to compression of the same. Fig. 2, is a transverse section of the pneumatic tire showing one method of combining the puncture-proof cushion or shield, with said tire. Fig. 3, is a similar view showing the manner in which the cushion, or shield, yields under the action of a sharp point, or edge, penetrating the external casing. Fig. 4, is a transverse section showing one method of incorporating the puncture-proof cushion, or shield, in the body of the pneumatic tire. Fig. 5, is a view showing the application of the shield to a specific form of pneumatic tire.

In the said drawings the reference-numeral 1 indicates the pneumatic, or air-inflated tire, which may be constructed from any preferred material. For example, the external covering, or casing, may be formed of any suitable textile fabric, surfaced with, or having incorporated in its substance, india-rubber, or a compound thereof, vulcanized to the required degree of toughness and elasticity, or any other material, or compound, may be employed which is adapted to the purpose. The internal tube, is a separate casing, and may be of rubber, or a compound of the same, though I may use any other material which will possess the necessary qualities.

To fully protect the internal casing 2, which receives and retains the air, and to secure the same from all danger of being punctured, or ruptured by sharp points, or edges, which may penetrate the outer envelope or casing, I provide a shield, or cushion, composed of one or more layers 3 of any suitable textile fabric, such, for example, as linen, muslin, canvas, or other similar material, alternating with layers of raw cotton 4. The textile fabric I impregnate with tar, preferably pine-tar, and upon the latter is sprinkled pulverized resin. In the body of the cushion, or shield, thus formed, is interposed a layer of wire fabric 5, composed of a weft of fine wire, having, preferably, a warp of cord, of larger diameter. I may, however, use a fabric composed entirely of wire, should this be desirable, and I insert said fabric in the body of the shield, or cushion, in place of one of the layers of textile fabric, treating it in the same manner with tar and resin. If three layers of textile fabric are employed, the wire fabric may be inserted in place of any one of the three, though I prefer placing the same in the center or in the place of the outer layer of textile material.

The shield or cushion, constructed as described, may be combined with, or incorporated in, the pneumatic tire in any preferred manner. For example, it may be placed between the outer casing 1 and an inner casing containing the inflating body of air, or it may be incorporated in the body of pneumatic tire, as shown in Fig. 4. In either case, it need extend only over that portion which is directly, or indirectly, exposed to puncture, or other injury.

No special mechanism is required in compressing the cushion or shield, in the presence of heat, as I may employ any ordinary form of rolls, heated internally by gas, or other suitable means, or any apparatus suitable for the purpose may be used instead of rolls.

My invention is capable of being used in combination with any known form of pneumatic tire, without material change in the latter.

I may employ as a substitute for the raw-cotton, any other fibrous material which will answer the same purpose.

The protective shield may be used with the ordinary "hose-pipe" pneumatic tire, shown in Fig. 5, by merely applying it to the exterior thereof, the lateral flaps being extended sufficiently to surround the tire, or nearly so, and receive a lacing or other suitable fastening.

What I claim is—

1. A pneumatic tire having a protective cushion, or shield composed of one or more layers of textile fabric, alternating with one or more layers of raw cotton, and a layer of wire fabric interposed in the body of the same, said textile fabric and wire fabric being impregnated with tar and sprinkled with resin and the mass being united under heat and pressure, substantially as described.

2. The combination with a pneumatic tire of a protective shield, or cushion, composed of one or more layers of textile fabric and a layer of wire fabric, alternating with layers of raw cotton, the textile and wire fabric being impregnated with tar and treated with resin and the whole united by heat and pressure, combined, substantially as described.

3. A protective shield, or cushion, for pneumatic tires consisting of alternate layers of textile fabric and raw-cotton, and a sheet of wire fabric inserted in the mass, said textile and wire fabric being treated with tar and resin and the whole united under heat and pressure, substantially as described.

4. The combination with a pneumatic tire of a protective cushion, or shield, consisting of one or more layers of textile fabric alternating with one or more layers of such fibrous material as raw cotton, with an interposed layer of wire netting, the textile fabric and wire netting being treated with tar and powdered resin and the whole united under heat and pressure, the shield so formed being attached to the lateral portions of the tire and detached from the bearing face, or portion, substantially as described.

In testimony whereof I affix my signature in presence of two witnesses.

S. MILFORD SCHINDEL.

Witnesses:
EWELL A. DICK,
CHAS. B. TILDEN.